United States Patent [19]
Zurek et al.

[11] 3,722,642
[45] Mar. 27, 1973

[54] SELF-ACTUATED MECHANISM FOR BRAKING A DRIVEN MEMBER UPON DISCONTINUATION OF DRIVE THERETO

[75] Inventors: James W. Zurek, Lombard; David A. Fulghum, La Grange, both of Ill.

[73] Assignee: International Harvester Company, Chicago, Ill.

[22] Filed: Apr. 13, 1971

[21] Appl. No.: 133,641

[52] U.S. Cl. ................................. 192/8 R, 192/16
[51] Int. Cl. ......................................... F16d 67/00
[58] Field of Search ............... 192/8, 15, 16, 64, 36

[56] References Cited

UNITED STATES PATENTS

| 1,532,877 | 4/1925 | Buck | 192/8 R |
| 1,863,556 | 6/1932 | Cottrell | 192/15 |
| 3,194,367 | 7/1965 | Winter | 192/16 |

*Primary Examiner*—Charles J. Myhre
*Assistant Examiner*—Randall Heald
*Attorney*—Floyd B. Harman

[57] ABSTRACT

A mechanism adaptable for connection between a drive and rotatable shaft to provide a driving connection therebetween when mechanical power flows from the drive to the shaft, the mechanism being operable to produce a self-actuating braking force on the shaft when the power flow is interrupted thereby preventing extended free-wheeling of the shaft.

13 Claims, 6 Drawing Figures

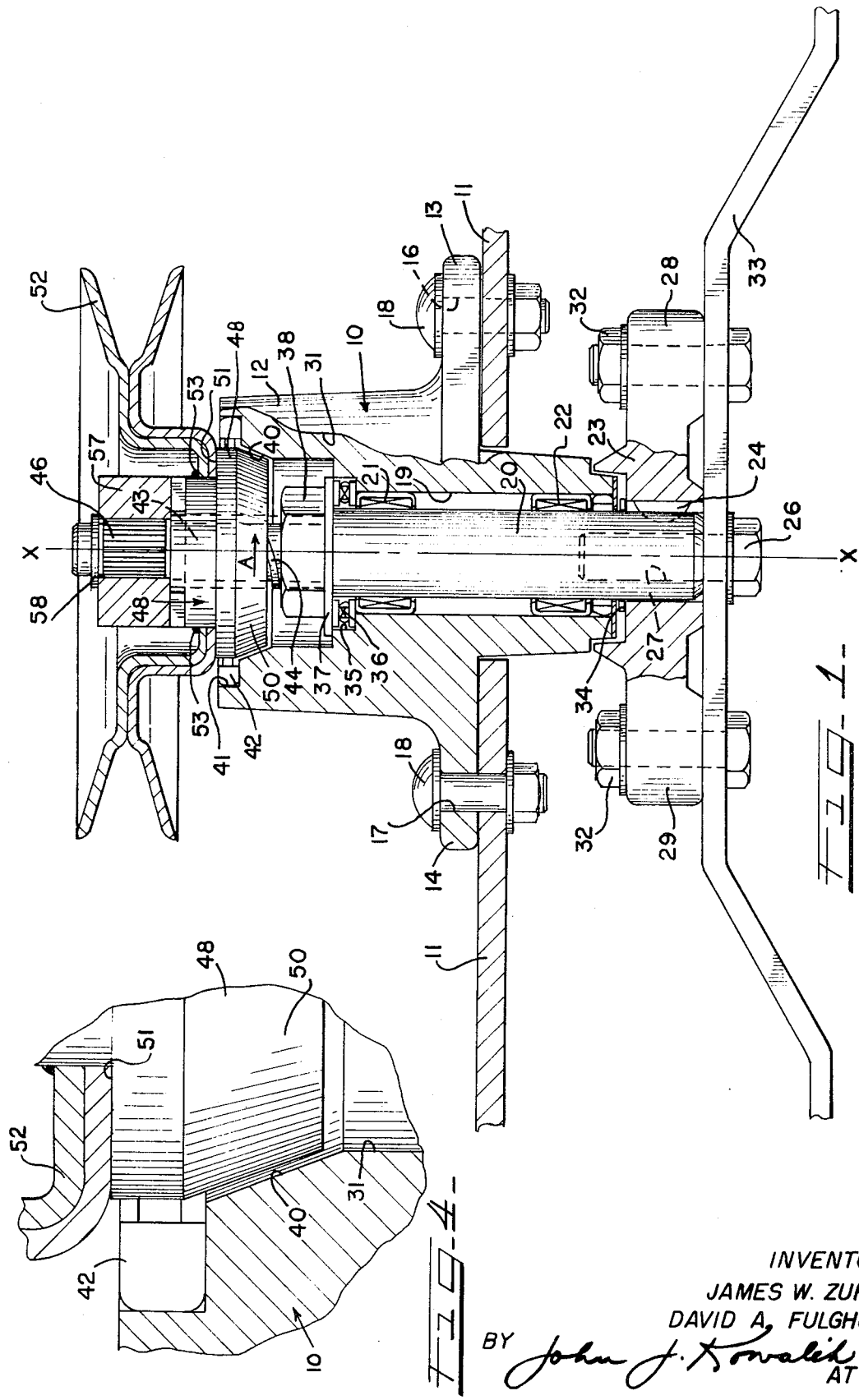

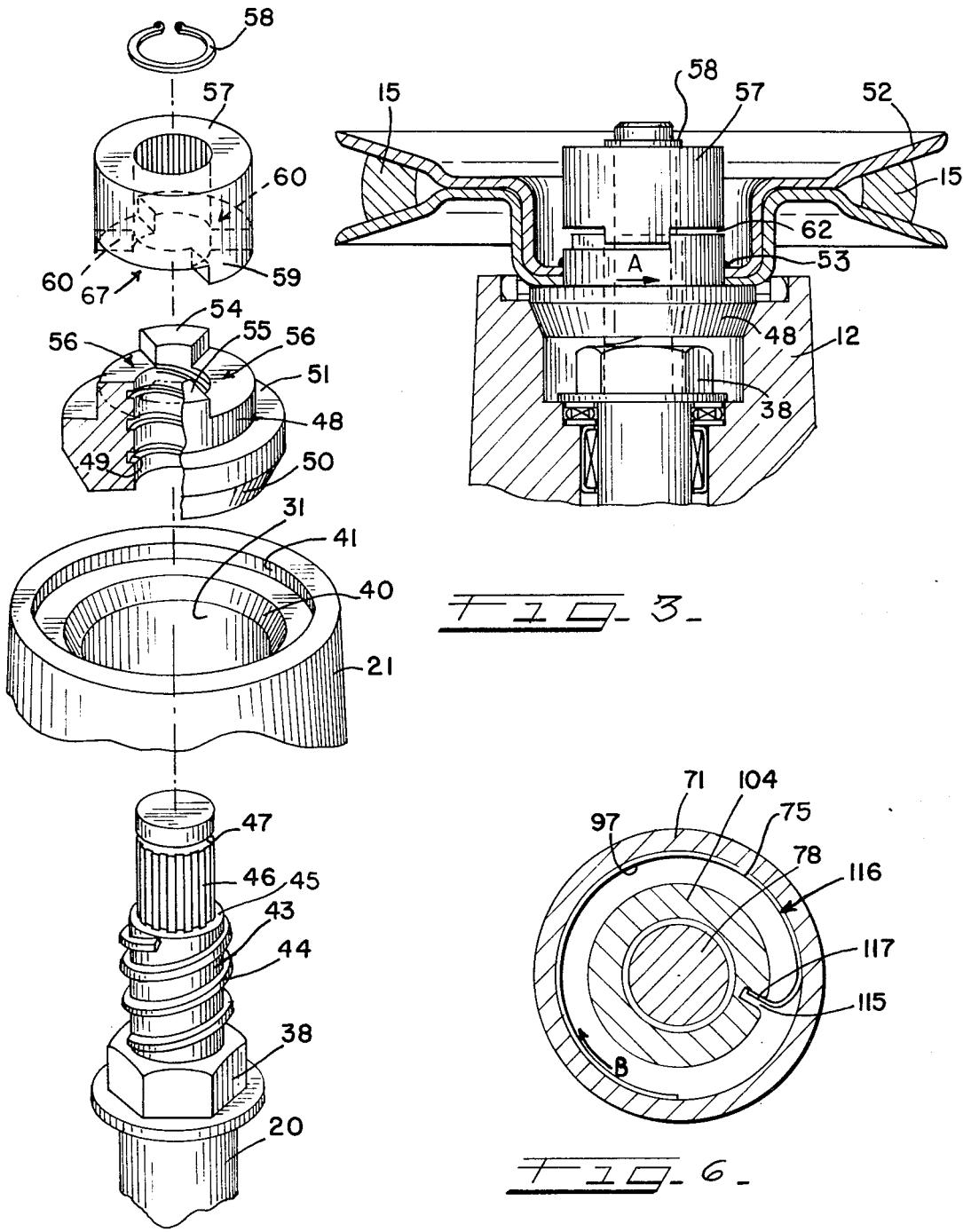

PATENTED MAR 27 1973

INVENTORS
JAMES W. ZUREK
DAVID A. FULGHUM

BY John J. Kowalik
ATT'Y.

3,722,642

SELF-ACTUATED MECHANISM FOR BRAKING A DRIVEN MEMBER UPON DISCONTINUATION OF DRIVE THERETO

BACKGROUND OF THE INVENTION

Oftentimes it is desirable to provide a braking mechanism on rotating equipment to expend the kinetic energy stored in driven members and thereby prevent extended free-wheeling of those members after a driving source has been disconnected. Manually operated braking devices can, of course, be provided with the attendant disadvantage that they are dependent on an overt act of an operator. It is apparent that in certain situations, such as the driving of rotary cutters in lawn mowers, choppers or other forms of equipment having rotary members more or less accessible to an operator, manually operable braking devices to stop such rotary members could be employed with an included disadvantage that the operator must continually remember to engage and disengage the brake during operations. Often such devices fall into disuse.

Others have employed overrunning clutches which do not provide a braking action on the rotating members but rather produce an audible sound when the driving source is disconnected which may alert the operator that the rotary member is still in motion.

The general object of the instant invention is to provide a braking mechanism or device operatively connectable to a rotatable member wherein a self-actuating braking force is effected on those members to prevent their extended free-wheeling motion.

Another object of the invention is to provide that the braking device be effective to couple power transmission from a driving source to the rotary members and be operative to produce a self-actuating braking action on those members when the transmitted power is interrupted.

A more specific object of the foregoing is that the invention utilize the momentum of the rotary members while in free-wheeling motion to actuate the mechanism and provide forces to effect the braking action.

Still another object of the invention is to provide that the braking mechanism be adaptable for use in a plurality of positions and substantially independent of gravitational forces.

A general object of the embodiments of the invention herein described is to provide the mechanism be adaptable to mount on a drive shaft carrying the rotatable members and include means for receiving power from the driving source.

Another object of the invention as delineated in the embodiments is to provide a driving connection to the shaft when mechanical power flow is delivered thereto in a certain direction and produce braking forces to the shaft when that flow is reversed.

Still another object of the invention is to provide that an element of the mechanism having a braking surface engageable with another surface to effect a braking action whereat the angular relationship of this surface during engagement produces a wedging action thereat.

A more specific object of the foregoing is to provide that the element of the mechanism having the braking surface and the other surface move into engagement during braking operations wherein the momentum of the rotary members in free-wheeling motion provides forces effecting such movement.

A still further object of one of the embodiments is to provide a mechanism in which the drive shaft is substantially axially static during both driving and braking operations.

A more specific object of the invention is to provide that a supporting structure journalling the drive shaft have braking surfaces disposed in angular interacting relation to the braking surface on the mechanism.

Other objects and features of the present invention will become more fully apparent in view of the following detailed description taken in conjunction with the accompanying drawings illustrating embodiments incorporating the inventive concepts hereinafter disclosed.

BRIEF DESCRIPTION OF THE DRAWINGS

FIG. 1 is a side elevational view partially in section of a first embodiment of a drive-brake mechanism incorporating the invention as applied to a simple power transferring device and showing the same in a driving position;

FIG. 2 is an enlarged exploded pictorial view of the drive transfer mechanism shown in the first embodiment;

FIG. 3 is a partial sectional view of FIG. 1 showing the mechanism in a braking position;

FIG. 4 is an enlarged fragmentary sectional view of the interacting braking surfaces of the first embodiment illustrating their angular relationship;

FIG. 5 is an elevational view partially in section of a second embodiment of a drive-brake mechanism and showing the same in a driving position; and FIG. 6 is a partial sectional view of the mechanism of FIG. 5 taken at line 6—6 of FIG. 5.

DESCRIPTION OF THE PREFERRED EMBODIMENTS

Attention is first directed toward FIG. 1 and the first embodiment of the instant invention, namely a drive and self-actuating brake mechanism generally designated 10, mounted in typical operating position on a partially illustrated housing 11 of a rotary cutting machine, such as a mower.

The mechanism comprises a support sleeve 12 having mounting flanges 13 and 14 with holes 16 and 17 through which bolt assemblies designated 18 may be employed to secure the standard 12 to the housing 11. The standard 12 has a central bore 19 in which a shaft 20 is journalled and rotatably supported by upper and lower bearings 21 and 22 respectively. The mechanism 10 is shown arranged in a vertical orientation for illustration purposes only. It is to be understood that the mechanism may be utilized in other positions than shown and references to an upper or lower disposition of parts is used merely for convenience in describing its structure.

The lower end of the shaft 20 protrudes from the sleeve and has a hub 23 secured thereto by a key 24 and bolt 26 threaded into bore 27 as shown. The hub 23 has a pair of diametrically disposed ears 28 and 29 thereby in which bolt assemblies 32 secure thereto a member 33 which may be a cutting blade of a mower. A wear washer 34 is disposed between the hub 23 and lower edge of sleeve 12.

The upper end of the central bore 19 has a widened portion 35 forming a shoulder which receives a bearing 36 which rotatably supports a washer wear member 37 held in position about the shaft 20 by a nut 38 threadedly secured on a threaded part of the shaft 20 disposed within the widened portion 35 in the position shown. It can be appreciated that this arrangement will prevent substantial axial displacement of the shaft 20 within the standard 12 as the shaft is constrained to rotate about a common and coincidental axis designated X—X of the shaft 20 and central bore 19. Adjacent the widened portion 35 the bore 19 widens at 31 and then flares outwardly to define the braking surface 40 which is conically shaped and symmetrically disposed about the axiS X—X. At the upper end of the standard 12 the bore 19 has a still wider portion 41 into which is nested a dust seal 42.

As best seen in FIG. 2 the shaft 20 includes a power drive shank portion 43 which extends outwardly and upwardly from the nut 38. A continuously helical land or rib 44 is spirally formed about said shank 43 and extends from the nut 38 to a shoulder 45 from which extends a diametrically smaller splined portion 46. A groove 47 is provided above the splined portion 46 and that end of the shaft 19, as shown.

A drive member 48 which also serves as a brake member is dispOsed on the shank portion 43 Of the shaft 20. The member 48 haS a bore with a spiral groove 49 and interthreadedly fits on rib 44. The lower end of the member 48 has beveled or conical braking surface 50 which is angled to complementally mate with the braking surface 40 of the support sleeve 12. In operation when member 48 is rotated relative to the shaft 20 in a direction as indicated by arrow A FIG. 3, the member 48 will ride on the rib 44 and move outwardly, that is upwardly, toward the splined portion 46 of the shaft 20. Conversely when relative rotation of the member 48 in the opposite direction occurs it will move in an axial inward or downward direction such, that surfaces 40 and 50 engage. At the upper end of the member 48 the diameter thereof is reduced to provide a shoulder surface 51 onto which a sheave 52 can be affixed to the member 48 by such means as welding as indicated at 53. It is apparent that a sprocket, coupling mechanism or other drive devices could be easily adapted to siMilarly mount the member 48. A pair of diametrically disposed driving lugs 54 and 55 are provided on this reduced end of the member 48; and each of the lugs (54, 55) are of sector form defining spaces 56 therebetween. Drive hub stop means 57 have a splined inner bore complementally matingly mounted onto the splined portiOn 46 of the Shaft 20 and thereby constrained to rotate therewith. A locking ring 58 is fitted into the groove 47 to hold the hub 57 captive on the shaft 20 between the shoulder 45 and the ring 58 whereby axial movement of the hub 57 is prevented. The inner end of the hub 57 has a pair of diametrically disposed engaging jaw clutch lugs 59 and 60 with spaces 67 therebetween. The spaces 67 have sufficient dimension and are disposed relative to the lugs (54, 55) and spaces (56, 60) to provide for the necessary rotary travel of the member 48 about the shank to effect axial displacement to and from braking engagement with the sleeve 12. FIG. 3 (which illustrates the mechanism 10 in braking position) shows that a gap 62 is provided between the member 48 and the hub 57. The hub 57 should be arranged on the splined shaft such that the driving lugs 54 and 55 of the member 48 drivingly engage the lugs 59 and 60 of the driving hub 57, just before the gap 62 closes. This prevents substantial outward axial thrust on the hub 57 by the member 48 when it is being driven in by the sheave 52.

EMBODIMENT OF FIGS. 5 AND 6

Attention iS now directed to the second embodiment shown in FIGS. 5 and 6, which depicts another drive-brake mechanism 70 which is operatively similar to the mechanism 10 of the first embodiment, but has certain other novel features hereinafter described.

The mechanism 70 comprises a sleeve 71 having flanges 72 and 73 which have holes 74 and 75 for mounting the sleeve 71 by bolt assemblies as shown to a housing 76 of a choppIng mechanism, such as a forage chopper as suggested in FIG. 5. The standard 71 has a central bore 77 into which a shaft 78 is disposed and journalled therein by bearings 79 and 80. The inner end of the shaft 78 extends from that end of the sleeve 71 and has a threaded bore 81. A hub 82 is secured to the shaft by key 83 and bolt 84 with a wear washer 85 providing necessary clearance. The hub 82 has lugs 86 and 87 each with holes for mounting to an end plate 88 of a rotatable element such as a forage chopping rotor designated 89 by means of bolt assemblies 90.

Toward the other end of the sleeve 71 the central bore 77 has a widened portion 91 defining a shoulder against which is placed a bearing 92. A snap ring 93 rides on the bearing 92 and is simultaneously disposed in aligned grooves 94 and 95 disposed in the shaft 78 and the wall of the sleeve at the widened portion 91 of the bore 77 respectively to thereby retain the shaft 78 in the position and prevent axial movement thereof. Adjacent the portion 91 the bore 71 flares outwardly and is shaped to form an internal conical braking surface 96. Outwardly from the braking surface 96 the bore 71 is enlarged diametrically and presents a circumferential surface 97 and a radial surface 98. A groove 99 interrupts surface 97 adjacent the surface 98.

The shaft 78 comprises a screw portion 100 which extends from the snap ring groove 94 outwardly toward the outer end thereof. This portion 100 has a continuous helical land or thread 101 disposed thereabout as shown. The shaft 78 extends outwardly beyond the sleeve 71 and thereat has a threaded portion 102 which is diametrically smaller than the screw portion to provide a shoulder surface 103.

A drive-braking member 104 which comprises a cylindrical body with a lower conical surface 105 and an upper shoulder portion 106 has an internal bore 107. A spiral groove or thread 103 is formed in bore 107 and is dimensioned to rotatably fit and screw on and off the screw portion 100 of the shaft 78 by threading on and off thread 101 to effect an axial movement of the member 104 relative to the shaft 78 upon relative rotary motion between the shaft 78 and member 104.

A sheave 109 and dust cover 110 are secured to the member 104 against shoulder portion 106. A dust seal 111 is provided between the body of the member 104 and wall surface 97 of the sleeve 71. A stop washer 112 is disposed on the shoulder 103 of the shaft 78 to restrict (outward) upward axial travel of the member 104 upon relative rotation to the shaft 78. The washer 112 is held in position by nut 113 threadedly fitted on the end portion of the shaft. FIG. 5 shows that a gap 114 has been provided between the washer 112 and the adjacent end of the member 104 when the surfaces 96 and 105 are in engagement. It can be appreciated that when relative rotary motion between the member 104 and the shaft 78 (as indicated by arrow A) occurs the member 104 will axially move (outwardly) upwardly to close the gap 114 and abut the washer 112, and thus the member 104 can move axially from braking contact with the standard 71 to a drivinG relation with shaft 78 upon being stopped by the washer 112.

The member 104 also has a notch 115 (FIG. 6) extendIng axially along its body from the beveled end thereof. A drag spring or reaction ring 116 has an inwardly projecting hole or leg 117 entered into the notch 115 and an annular portion 116a compressed within groove 99 in continual frictional engagement with the sleeve 71. The drag rinG 116 is formed of spring steel and of such a diameter that it must be compressed to fit into the groove 99 and thus in constant pressure engagement with the sleeve 71. This provides a frictional retarding force on the member 104 manifest as a counter torque being generally opposite in direction to a driving torque applied to drive the member 104 in the diRection indicated by the arrow B.

OPERATION OF EMBODIMENT OF FIGS. 1–4

The operation of the first embodiment is as follows: First consider the mechanism 10 being mounted on the mower housing 11 and in the braking mode as shown in FIG. 3, and a drive belt as indicated at 15 transmits driving torque from a suitable power source (not shown) to the sheave 52 and the member 48 causing them to rotate relative to the shaft as indicated by the arrow A.

As this occurs action between the land 44 on the shaft 20 and the groove 47 of the member 48 provides axial movement of member 48 such that the braking surfaces 40 and 50 disengage. The axial movement continues until the lugs 54 and 55 of the member 48 drivingly engage the lugs 59 and 60 of the driving hub 57 wherein the relative rotation movement between the member 48 and shaft 20 ceases and they both begin to rotate together with the member 48 driving the shaft 20 through the hub 57 whereby the cutting element 33 is rotated at a selected speed. It should be noted that the entire driving torque is tangentially applied to the shaft 20 by the peculiar engagement of the member 48 and driving hub 57. As long as the belt 15 is driven at the same rate the member 48 remains in driving relation to the hub 57 as hereinbefore described; this is because some torque is continually required to be delivered to the mechanism to maintain the selected speed of the cutting element 33.

When the driving torque delivered from the source is interrupted such as through the loosening of the belt 15 (through a suitable idler arrangement not shown), the momentum of the moving cutter element 33 now supplies torque to the hub 57 to drive the sheave 52 and the member 48. Torque must be supplied to drive the member 48 due to its resistance, to stay in motion caused by actions such as a wind resistance on the sheave and frictionAl resistance of the dust seal 4 contacting the member 48 producing a retarding or counter torque thereon. The cutting element 33 secured to the hub 57 now provides the driving torque. It can be appreciated that in order for the hub 57 to drive the member 48 there must be relative counter rotation between the member 48 and shaft 20. When this occurs the member 48 counterrotates relative to the shaft 20 wherein it moves axially inward or downwardly toward the standard 12 due to the action of the land 44 and groove 49. This inward movement continues until the braking surfaces 40 and 50 engage. The engagement of the braking surfaces 40 and 50 increase the counter-torque applied to the member 48 which in turn increases the inward axial thrust due to the increased lag on retardation of the member 48 relative to the rotating shaft 20 and therefore, action of the mechanism 10 is self-actuating and self-generating.

OPERATION OF EMBODIMENT OF FIGS. 5 AND 6

The operation of the second embodiment is essentially similar to that of the first. The drive-brake member 104 rotates relative to the shaft 78 when the sheave 109 is driven by a power source. This produces an initial relative rotational movement between the shaft 78 and the member 104 which causes the member 78 to move axially (outward) upwardly through the action of the land 101 and groove 108 on the member 104 and shaft 78 respectively. The member 104 continues to move axially until restrained by the stop washer 112 whereat the braking surfaces 105 and 96 of the member 104 and standard 71 respectively are disengaged and the member 104 is in driving relation to the shaft 78. In this embodiment the drag ring 116 provides an initiating counter torque on the member 104 which effects counter-rotation of the member 104 when the driving torque applIed to the sheave 109 is interrupted. At this time the momentum of the rotor 89 is now the driving force on the shaft 78 and the counter-torque produced by the ring 116 along with the shaft 78 being in driving relation to the member 104 cause a counter rotation of the member 104 on the shaft 78 producing an attendant inward axial movement of the member 104 until the braking surfaces 105 and 96 engage. When this occurs the brakinG action becomes self-generating because the counter-torque is initially increased which in turn increases the inward thrust of the member 104 thereby forcing the braking surfaces more tightly together.

It will be appreciated that the embodiments of the invention chosen for the purposes of illustration and description herein are preferred based upon requirements for achieving the objects of the invention and developing the utility thereof in the most desirable manner, due regard being had to existing factors of economy, simplicity of design and conStruction, production method and the improvements sought to be effected. It will be understood, that the particular structure and functional aspect emphasized herein are not intended to exclude but rather to suggest such other modifications and adaptations as fall within the spirit and scope of the invention.

What is claimed is:

1. An implement having a cutter, a drive-brake mechanism for driving and braking said cutter automatically shiftable between drive and brake conditions in response to the direction from which drive torque is delivered thereto comprising:

support means 12, 71 having a first braking surface 40, 96 thereon;

torque transfer means 20, 78 journalled on said support means;

torque transmitting means 52, 109 coupled by coupling means to said torque transfer means, said torque transmitting means having means 48, 104 rotatably drivable from a source of driving torque;

said torque transmitting means including a second braking surface 50, 105 disposed for engagement with said first braking surface;

a normally driven energy-storing structure such as a cutter 33, 88 positively connected with said torque transfer means and driven thereby attendant to said torque transfer means being driven by said torque transmitting means in driving relation to said torque transfer means upon termination of drive thereto from said source;

shifting means 44, 49 100, 108 responsive to the direction from which driving torque is transmitted between said torque transfer means and said torque transmitting means, operative to move said torque transmitting means to a position disengaging said braking surfaces and establishing a driving relation with said torque transfer means upon said torque transmitting means being driven by the source of driving torque and operative to move the second braking surface of said torque transmitting means into engagement with said first braking surface upon said torque transfer means being driven by said energy storing structure.

2. The invention as recited in claim 1 wherein said shifting means effects axial movement of said torque transmitting means between brake engaged and disengaged positions.

3. The invention as recited in claim 2 wherein said braking surfaces are in the form of cone brakes.

4. The invention as recited in claim 3 wherein said shifting means comprises interthreaded threads on said torque transmitting means and said torque transfer means to produce counter axial displacement of said torque transmitting and torque transfer means to effect a driving of said torque transfer means by axial displacement of the torque transmitting means in one direction and a braking of said torque transfer means through axial displacement of the torque transmitting means in the other direction such that said braking surfaces engage.

5. The Invention as recited in claim 4 wherein drag means is operative against the torque transmitting means to load the same to initially induce said axial displacement thereof to effect engagement of said braking surfaces.

6. In an agricultural implement of the type having a housing mounting a rotor driven from an associated source, the improvement comprising: a drive-brake mechanism comprising:

a sleeve mounted on said housing and having a braking surface thereon;

a shaft journalled through said sleeve and comprising a spiral land;

a rotor mounted on the shaft;

an input member rotatably drivable by said source, said member having a spirally grooved bore threaded on the land wherein reverse relative rotary motions between said input member and said shaft effect corresponding axial displacements of said input member on said shaft, and said input member including a braking surface disposed adjacent said braking surface of said sleeve for engagement therewith when the rotor overruns the driving source.

7. The invention as recited in claim 6 wherein said drive-brake mechanism includes drag means operative to hold said input member against entrainment by said rotor when said shaft is in driving relation to said input member.

8. The invention as recited in claim 7 wherein said input member comprises an annular drag surface, and said drag means comprises stationary sphincteral spring means anchored to the sleeve and wrapped about said surface to provide a torque load thereon.

9. For a cutter including a casing, a drive-brake mechanism automatically shiftable within a range between drive and brake positions in response to the direction from which driving torque is delivered thereto comprising;

a. three coaxially arranged bodies including;

b. a first body connected to a source of driving torque; first c. a second body coupled by coupling means at one extreme of said range to said first body and functioning as a guide axis therefor, said second body provided with output means;

d. a third body held against rotary entrainment by said casing said second body supported by said third body and said first and third bodies provided with confronting braking surfaces, said confronting braking surfaces arranged to engage at the other extremity of said range;

e. and means for relatively shifting said first and third bodies axially to engaged position of the braking surface to stop rotation of said first and second bodies upon discontinuance of delivery of driving torque to said first body, and to disengaged position of the braking surfaces to effect drive from the first to the second body in consequence of driving torque being delivered to the first body.

10. The invention according to claim 9 and said first body comprising a rotary member, said second body comprises a shaft and the third body comprises a sleeve providing a journal for the shaft.

11. The invention as set forth in claim 1 wherein said coupling means comprise lugs extending axially from both said torque transfer means and said torque transmitting means, said lugs having axially aligned confronting surfaces that engage to transmit rotary motion from said torque transfer means to said torque transmitting means.

12. The invention as set forth in claim 6, wherein there are coupling means between said input members and said shaft, said coupling means comprise lugs extending axially from both said input member and said shaft, said lugs having axially aligned confronting surfaces that engage to transmit rotary motion from said input member to said shaft.

13. The invention as set forth in claim 9 wherein said coupling means comprise lugs extending axially from both said first and second bodies, said lugs having axially aligned confronting surfaces that engage to transmit rotary motion from said first body to said second body.

* * * * *